(12) United States Patent
Webster

(10) Patent No.: US 7,717,646 B2
(45) Date of Patent: May 18, 2010

(54) METHOD AND APPARATUS FOR DEPLOYING A TUBULAR

(75) Inventor: David Webster, Monmouth (GB)

(73) Assignee: Energy Equipment Corporation, Houston, TX (US)

( * ) Notice: Subject to any disclaimer, the term of this patent is extended or adjusted under 35 U.S.C. 154(b) by 339 days.

(21) Appl. No.: 11/656,164

(22) Filed: Jan. 22, 2007

(65) Prior Publication Data

US 2008/0014023 A1    Jan. 17, 2008

(30) Foreign Application Priority Data

| Jan. 21, 2006 | (GB) | ................................ 0601219.9 |
| Apr. 27, 2006 | (GB) | ................................ 0608333.1 |
| Jun. 16, 2006 | (GB) | ................................ 0611982.0 |
| Jun. 28, 2006 | (GB) | ................................ 0612815.1 |

(51) Int. Cl.
*F16L 1/12* (2006.01)

(52) U.S. Cl. .................... 405/168.3; 405/166; 405/158

(58) Field of Classification Search ................ 405/158, 405/166, 168.1–168.4, 169, 170

See application file for complete search history.

(56) References Cited

U.S. PATENT DOCUMENTS

| 3,504,866 | A | | 4/1970 | Palynchuk et al. |
| 3,776,262 | A | | 12/1973 | Fritsch |
| 5,722,793 | A | * | 3/1998 | Peterson .................... 405/158 |
| 5,730,551 | A | * | 3/1998 | Skeels et al. ................ 405/170 |
| 6,350,085 | B1 | * | 2/2002 | Bath et al. .................... 405/166 |
| 6,578,599 | B1 | | 6/2003 | Ura |
| 6,588,980 | B2 | * | 7/2003 | Worman et al. ............. 405/158 |
| 6,776,559 | B1 | * | 8/2004 | Peterson ..................... 405/158 |
| 2002/0172562 | A1 | * | 11/2002 | Worman et al. ............. 405/161 |
| 2003/0106714 | A1 | * | 6/2003 | Smith et al. ................. 405/158 |

FOREIGN PATENT DOCUMENTS

| DE | 10114630 | 10/2002 |
| FR | 2726320 | 11/1994 |
| GB | 2337508 | 11/1999 |
| JP | 02276411 A * | 11/1990 |
| WO | WO03/046694 | 6/2003 |

\* cited by examiner

*Primary Examiner*—Frederick L Lagman
(74) *Attorney, Agent, or Firm*—Drinker Biddle & Reath LLP

(57) ABSTRACT

The invention provides an apparatus and a method of deploying a tubular along a predetermined path. The method includes the steps of: coiling a tubular; accommodating the tubular in a deployment unit such that at least a portion of the coiled tubular is biased radially outwardly against the deployment unit; and deploying the tubular from the deployment unit along the predetermined path. The tubular can be deployed in a fluid along a predetermined path by: independently suspending the deployment unit in the fluid; and moving the deployment unit adjacent the predetermined path and simultaneously deploying the tubular along the predetermined path. The apparatus for deploying a tubular can comprise a deployment facilitator for facilitating deployment of the coiled tubular. The tubular can be arranged to feed into the deployment facilitator in use, and the deployment facilitator can be adapted to substantially reverse the coil bend of the tubular.

25 Claims, 12 Drawing Sheets

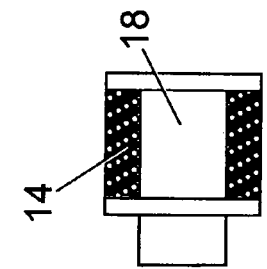
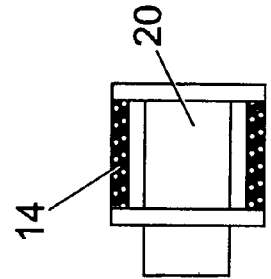
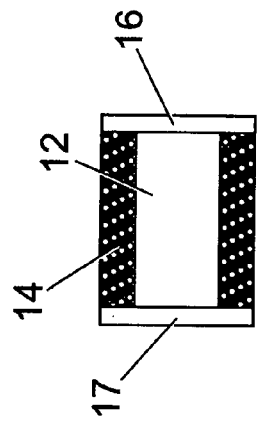
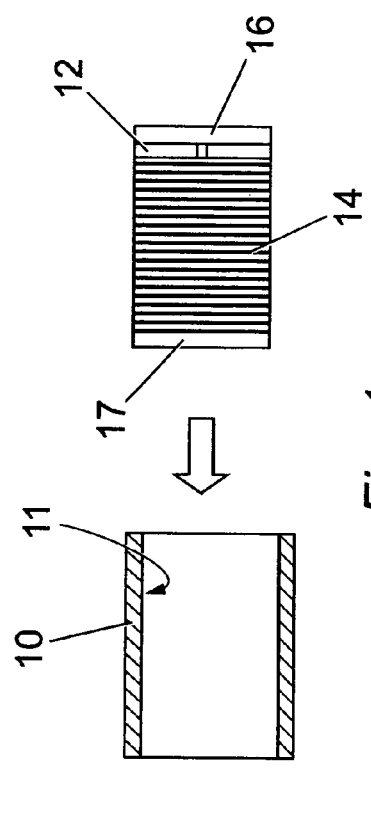
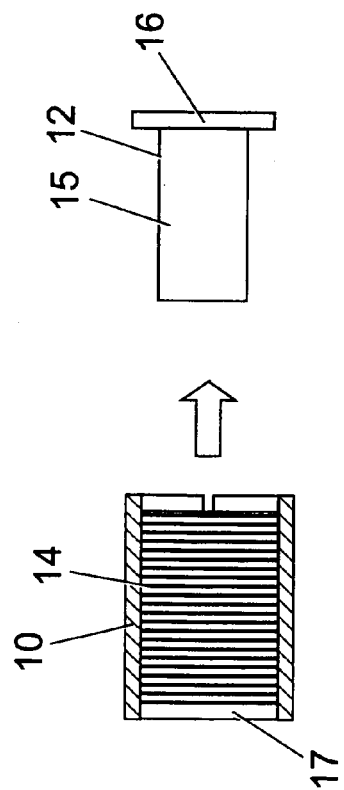

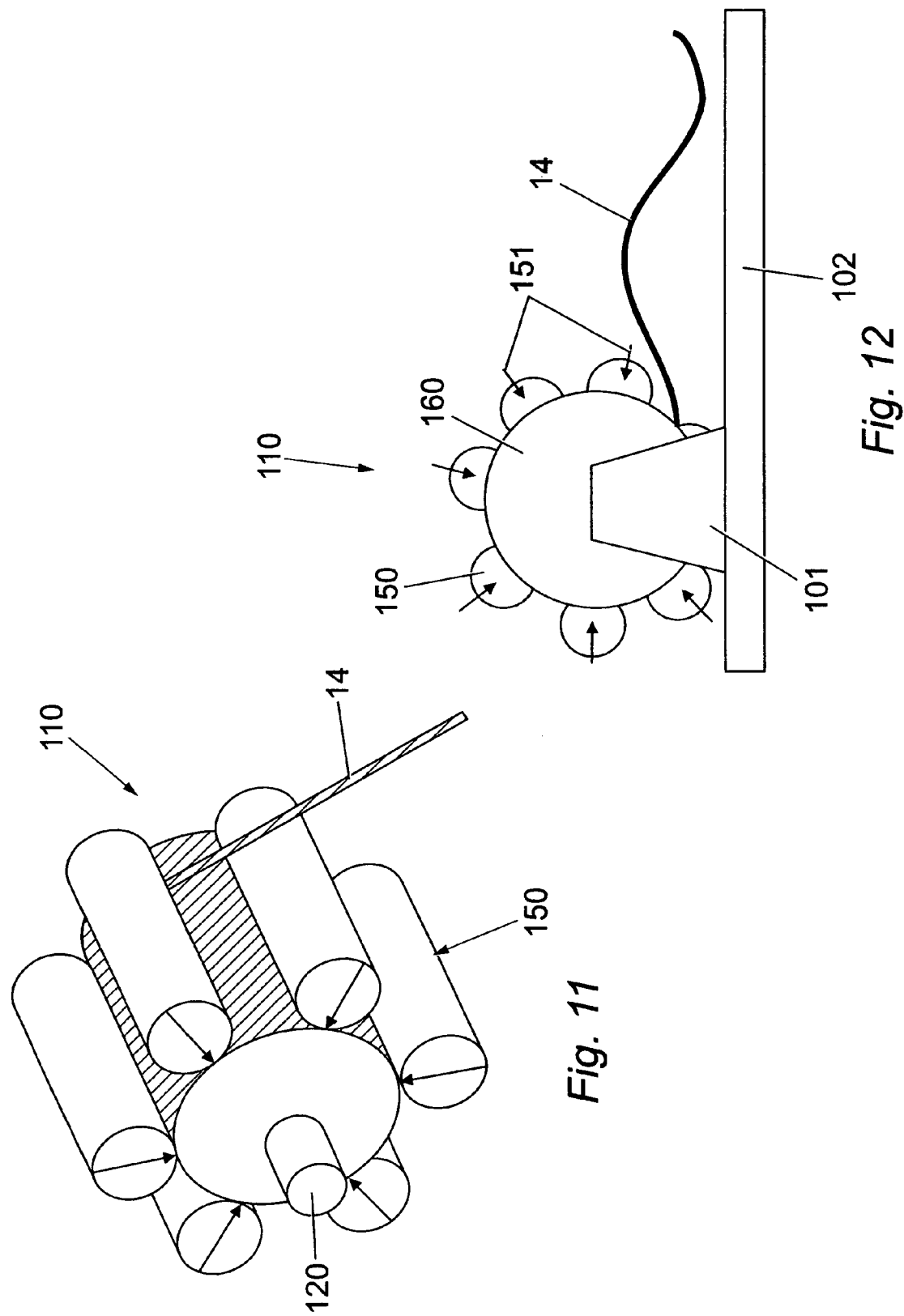

METHOD AND APPARATUS FOR DEPLOYING A TUBULAR

FIELD OF THE INVENTION

The present invention relates to a method and an apparatus for deploying a tubular along a pre-determined path. In particular, the method and apparatus is useful for subsea applications and for deployment of tubulars including jumpers comprising electrical power cables, communications cables and/or hydraulic lines.

BACKGROUND OF THE INVENTION

Subsea installations used in the oil and gas industry are often inter-connected by umbilicals, jumpers and other tubulars, which provide a conduit for electrical power, communications, hydraulic power and fluids between the various subsea installations. Conventionally, cables and tubulars have been installed from a reel located on a pipeline laying vessel on the surface of the sea. A remotely operated vehicle (ROV) typically carries each end of the jumper and flies it into position. If a jumper is installed onto a reel, bends are imposed on the jumper. When the jumper is unwound from the reel for deployment on the seabed, the jumper can kink and this can compromise the integrity of the jumper if the removal of the jumper from the reel during deployment is not properly controlled.

Furthermore, the jumper is required to be tensioned in order to maintain the jumper on the reel and avoid the coil diameter from expanding due to the energy stored in the coil. This can be achieved by simultaneously applying a braking force to the unravelling coil at the reel and engaging part of the jumper as it leaves the reel with rollers to impose a tension on the jumper and retain the jumper in its coiled condition. For subsea applications, the jumper is typically manufactured from steel and is relatively stiff. As a result, the forces that must be applied to maintain the jumper in tension can be considerable and could result in crushing of the jumper at the point where the rollers are gripping.

Jumpers can be deployed from a basket of a storage frame, without the need to apply this tension. However, towing the jumper over long distances places high demands on the ROV, which results in a maximum possible length of jumper of around 150 metres. If longer conduits are required between the subsea installations, one or more in-field umbilicals must be deployed from a vessel with each end of the umbilical positioned close to the required position adjacent the installation. The ends of the umbilicals can then be linked to the subsea installations using shorter jumpers to connect umbilical end terminations with the subsea installations. Thus, deployment of in-field umbilicals can be expensive and time consuming.

BRIEF SUMMARY OF THE INVENTION

According to a first aspect of the present invention, there is provided a method of deploying a tubular along a predetermined path, the method including the steps of:— coiling a tubular and accommodating the tubular in a deployment unit such that at least a portion of the coiled tubular is biased radially outwardly against the deployment unit; and deploying the tubular from the deployment unit along the predetermined path.

According to a separate aspect of the invention, there is provided an apparatus for accommodating a tubular to be deployed, the apparatus comprising a deployment unit having a coiled tubular at least partially accommodated therein, wherein at least part of an outer diameter of the coiled tubular is retained by the deployment unit.

The deployment unit can be provided with an open ended container and the coiled tubular can be retained at least partially within a bore of the container. The container can be arranged to rotate about an axis, typically around the axis on which the tubular is coiled.

An outer surface of the container can be supported on one or more bearings thereby allowing rotation of the container. Supporting or mounting the container so that it is able to rotate allows the torque (acting on an inner surface of the container) imposed by the tubular during uncoiling to move the container and thereby dissipate the excess energy that may otherwise result in deformation of the tubular. The container can comprise an inner cylinder surrounded by an outer housing and the inner cylinder can be rotatably coupled to the outer housing. The outer housing can optionally comprise an outer cylinder rotatably coupled to and coaxial with the inner cylinder.

The coiled tubular associated with the deployment unit can be arranged with an axis of coil that is substantially aligned with the direction in which gravity acts during at least part of the deployment operation. The axis of the coiled tubular can be arranged substantially perpendicular to the predetermined path along which the tubular is to be deployed throughout at least a part of the deployment operation. The method can include deploying more then 50% of the tubular along the predetermined path when the axis of coiled tubular is substantially perpendicular to the predetermined path. Preferably, the axis of the coiled tubular can be arranged so that it is perpendicular to the seabed. As used herein, "substantially perpendicular" can be taken to incorporate all configurations that are closer to a perpendicular position than a parallel position.

The coiled tubular and at least a portion of the deployment unit can be rotatably mounted about the coil axis that is substantially aligned with the direction in which gravity acts. Thus the tubular deployment operation can be aided by gravity. As a result, a lower force can be applied to the tubular to deploy the tubular from the deployment unit. The deployment unit can comprise a container and a frame, wherein the coiled tubular is retained at least partially within a bore of the container and the container is rotatably mounted on the frame such that the container is rotatable about the coil axis that is substantially aligned with the direction in which gravity acts. The axis of rotation can thus be substantially perpendicular to the seabed. The container can be rotatably coupled to frame by means of a swivel bearing. The method can include independently powering rotation of the container of the deployment unit. The method can include measuring a torque imposed by the tubular on the deployment unit during deployment and independently powering rotation of the container when the torque exceeds a predetermined maximum value. The frame can be coupled to a power supply for independently powering rotation of the container.

The container can have an opening at one end thereof. The opening can have a width less than the inner diameter of the container so that the end is partially enclosed. The partially enclosed end can at least partially retain the coiled tubular within the container and prevent the tubular from slipping out of the container under the effect of gravity. At least a portion of the enclosed end can comprise a frustoconical part. Preferably the frustoconical part is provided around the opening to aid deployment of the tubular. The container can comprise a centrally disposed expandable core. The core can be biased radially outwardly. Such an outwardly biased core enables removal of the lower windings of the coiled tubular without the risk of upper windings falling or collapsing radially inwardly. The container can have a second closed end to which the expandable core can be attached.

Alternatively, the deployment unit can comprise a reel having a retainer. The reel can be arranged to rotate about an axis, typically around the axis on which the tubular is coiled. The retainer can be arranged such that at least a portion of the coiled tubular is biased radially outwardly thereagainst.

The retainer can comprise a body that provides an impediment to expansion of the coil diameter. Preferably the body is of a length at least equal to the cylinder length of the coil on the reel and is arranged parallel with the coil axis on at least two opposing sides of the coil. According to one embodiment, the retainer can comprise a hinged shell having an opening through which the tubular can be deployed. Preferably the hinged shell comprises a pair of substantially semi-cylindrical half shells pivotable about a hinge. The half shells can be arranged to circumferentially circumscribe the reel, leaving an opening between the free ends of the half shells through which the tubular can be deployed. The width of the opening can be altered by pivoting the half shells about the hinge depending on the width of the coiled tubular on the reel. According to another embodiment, the retainer can comprise two or more rotatable cylinders extending along the cylinder length of the coil and can be arranged parallel to the coil axis and circumferentially spaced therearound. The reel can preferably rotate independently of the retainer. The radial distance between the rotatable cylinders and the core of the reel can be increased or decreased depending on the amount of coil windings on the reel.

Generally, coiled tubulars will tend to relax with the result that the diameter of the coil expands due to the energy stored within the coil. Uncontrolled expansion of the coil can be avoided using the present invention, by ensuring that the coiled tubular is captive within a deployment unit. This can be achieved by containing the outer windings of the coil such that at least a portion of the coiled tubular is biased radially outwardly against the deployment unit. Thus, a radial force is exerted on the coil to restrict expansion of the coil diameter, rather than applying a tension to the tubular itself.

The tubular can be provided with at least one reinforced end portion. The portion of the tubular between the reinforced end portion(s) can be retained within the container. Optionally, the reinforced end portion(s) can be accommodated within a second container. The second container can be detachably coupled to the deployment unit.

The method can include uncoiling the tubular prior to deployment along the predetermined path. The method can include substantially straightening the tubular during deployment. The method can include providing a container having a throughbore and accommodating at least part of the tubular within the throughbore. The method can include rotatably mounting the container on a part of the deployment unit. The method can include mounting the container on one or more bearings and thereby allowing rotation of the container. The method can include providing a container comprising an inner cylinder rotatably mounted on an outer housing. The outer housing can be an outer cylinder arranged around and coaxial with the inner cylinder. The method can include allowing the container or the inner cylinder of the deployment unit to rotate during deployment of the tubular.

As each coil is pulled off the coiled tubular, the tubular will be attempting to move so as to resolve any residual twists therein. Since the tubular is held as it is being deployed, the tubular itself cannot move (unless it deforms) to remove the twists. However, by accommodating the tubular within a rotatable container, remaining twists in the tubular can be compensated for by allowing the container to passively rotate and thereby dissipating the stored energy associated therewith. Thus, deformation of the tubular itself is less likely to occur.

The method can include attaching a deployment facilitator to the deployment unit for facilitating deployment of the tubular.

The method can include feeding the tubular between two or more rollers and thereby substantially straightening the tubular prior to deploying the tubular along the predetermined path. The method can also include adjusting the degree of bend imposed by the rollers for straightening the tubular.

The method can include independently powering rotation of the container of the deployment unit. The method can include measuring a torque imposed by the tubular on the deployment facilitator and independently powering rotation of the container when the torque exceeds a predetermined maximum value.

The method can include coiling a tubular around a coil axis prior to insertion into the deployment unit and withdrawing at least a portion of the tubular by applying a pulling force to at least a portion of the tubular in a direction substantially parallel to the coil axis. Alternatively, the tubular can be withdrawn by gripping part of the tubular to hold it stationary, and moving the deployment unit substantially parallel to the coil axis and away from the gripped tubular.

Alternatively, where the deployment unit comprises a reel, the tubular can be coiled directly onto the reel prior to deployment. Preferably, the reel is rotatably mounted and deployment of the tubular can be achieved by pulling the tubular tangentially from the deployment unit.

The method can include twisting the tubular as it is coiled onto a reel for direct deployment therefrom or prior to insertion of the reel into the deployment unit. Preferred embodiments of the method of the invention can include twisting a given length of the tubular by a predetermined amount in one direction, for example, clockwise, and twisting a corresponding subsequent length of the tubular by the predetermined amount in an opposing direction, for example, anticlockwise, during coiling of the tubular. This oscillating twist also avoids the requirement to provide different lengths of cables making up the tubular and ensures that each cable extending axially within the tubular is positioned towards an outer diameter of the tubular coil with the same frequency that it is positioned towards an inner diameter of the tubular coil, which reduces stress on the individual cables. The method can also include imposing a twist for every full turn of the coil and in a direction opposing the direction of the coil. This "reverse twist" is applied to the tubular to alleviate the effects of the slight displacement of the tubular on each occasion that the tubular is wound around the reel.

The method can include moving the deployment unit adjacent the predetermined path and simultaneously deploying the tubular along the predetermined path.

The apparatus is optionally suitable for use in a fluid and the method can include deploying the tubular along the predetermined path in a fluid. Preferably the apparatus and method are used subsea. The method can include deploying the tubular along the predetermined path on a seabed. The method can include coupling the tubular to one or more installations on the surface of the sea. The tubular can be coupled to the installation(s) by deploying one or more reinforced connecting portions. The connecting portions can be separate from the remainder of the tubular or can be integrally formed at ends thereof. Examples of such installation(s) on the surface of the sea include oil and gas rigs and platforms, vessels and wind generators. This method of deploying one or more reinforced connecting portions can also be used in conjunction with other aspects of the invention.

"Subsea" as used herein is intended to incorporate any body of water (fresh or salt water or otherwise). "Seabed" and "surface of the sea" as used herein are intended to refer to the lower and upper surfaces respectively, of any body of water (fresh or salt water or otherwise).

The method can also include stabilising the deployment unit such that moving the vessel causes corresponding movement of the deployment unit. Stabilising the deployment unit can substantially restrict the flow of fluid acting on the deployment unit as the tubular is deployed.

The method can include independently suspending the deployment unit. The deployment unit can be suspended from a vessel. The method can include moving the vessel to thereby move the deployment unit adjacent the predetermined path.

According to a second aspect of the present invention, there is provided a method of deploying a tubular in a fluid along a predetermined path, the method including the steps of:

coupling the tubular to a deployment unit;
independently suspending the deployment unit in the fluid; and
moving the deployment unit adjacent the predetermined path and simultaneously deploying the tubular along the predetermined path.

The method can include suspending the deployment unit from a vessel. The method can also include moving the vessel and thereby moving the deployment unit adjacent the predetermined path.

The method can include stabilising the deployment unit such that moving the vessel causes corresponding movement of the deployment unit. Preferably, stabilising the deployment unit substantially restricts the effect of fluid acting on the moving deployment unit. Stabilising the deployment unit can include substantially vertically aligning the deployment unit with the vessel. Stabilising the deployment unit can include substantially aligning an axis of the deployment unit parallel to or perpendicular with the direction of travel of the deployment unit.

The method can include coiling the tubular around an axis and coupling the coiled tubular to the deployment unit prior to suspending the deployment unit. The method can further include providing the deployment unit with a container housing at least part of the tubular within the container. The method can include providing a tubular with at least one reinforced end portion and accommodating the reinforced end portion(s) in a second container detachably coupled to the deployment unit.

The method can include deploying the tubular by applying a force to a portion of the tubular in a direction substantially parallel to the coil axis, typically pulling the tubular off the coil.

Alternatively, the method can include coiling the tubular onto a reel and rotatably mounting the reel with respect to another part of the deployment unit. Deployment of the tubular along the predetermined path can be achieved by pulling the tubular tangentially off the coil and allowing the reel to rotate.

The method can also include providing a deployment facilitator adapted to transfer at least part of the tubular from a first storage configuration to a second deployed configuration. The method can further include uncoiling the tubular prior to deployment along the predetermined path. This step can include feeding the tubular into the deployment facilitator or an uncoiling device such as a roller assembly. Typically the coiled tubular can be fed between two or more rollers to substantially straighten the tubular prior to deploying the tubular along the predetermined path. The method can also include adjusting the degree of bend imposed by the rollers for straightening the tubular.

The method may include supporting an end of the tubular at a predetermined distance above the seabed. This method step can include standing an end of the tubular approximately 1-10 metres above the seabed.

The fluid is preferably a liquid, and the method can be used subsea.

The tubular can have two ends, wherein each end is provided with an end connector. At least one of the end connectors can also be provided with a stand.

The container can be provided with at least one retaining member for accommodating and retaining an end connector. Alternatively or additionally, the deployment unit can be provided with at least one retaining member for accommodating and retaining an end connector.

According to another aspect of the invention there is provided an apparatus for deploying a tubular, the apparatus comprising a coiled tubular and a deployment facilitator, wherein the tubular is arranged to feed into the deployment facilitator in use, and wherein the deployment facilitator is adapted to substantially reverse the coil bend of the tubular.

The deployment facilitator can be adjustable to vary the degree of reverse bend imposed on the tubular, either to substantially straighten the tubular, or to impose a degree or direction of bend that is different to that originally adopted. The deployment facilitator can comprise a roller assembly.

The roller assembly can comprise at least two counter-rotatable rollers for accommodating the tubular therebetween. The outer circumference of one rotatable roller can be selectively movable around the outer circumference of the other rotatable roller to vary the reverse bend imposed by the roller assembly.

The diameter of one of the counter-rotatable rollers can be greater than the diameter of the other roller. The smaller diameter counter-rotatable roller can be selectively moveable around the circumference of the larger diameter roller to vary the reverse bend imposed by the roller assembly.

The roller assembly can comprise a further roller rotatably mounted separate from the counter-rotatable rollers to feed the tubular through the counter rotatable rollers at a predetermined angle.

The coiled tubular can be housed in a deployment unit. At least a portion of an outer diameter of the coiled tubular can be retained by the deployment unit.

The deployment unit can comprise an open ended container. The container can be rotatable about an axis of coil of the tubular. The container can be supported on bearings, thereby allowing rotation of the container about the coil axis. This arrangement allows the container to passively rotate during deployment of the tubular to alleviate excess strain as the tubular is uncoiled.

The deployment unit can also be provided with a driver to assist rotation of the container. The driver can be actuable when the torque imposed by the tubular on the deployment facilitator exceeds a predetermined value.

Alternatively, the coiled tubular can be wound on a reel and the reel can be rotatably mounted with respect to the deployment unit.

According to another aspect of the invention, there is provided a method of deploying a tubular including the steps of:

providing an at least partially coiled tubular;
feeding the tubular through a deployment facilitator; and substantially reversing the bend imposed on the tubular as a result of the coil, and deploying the tubular.

The method can include varying the degree of reversal of the coil bend. The method can further include feeding the tubular through counter-rotatable rollers and thereby reversing the coil bend of the tubular.

"Tubular" as used herein can be any substantially flexible line, umbilical or a bundle thereof, that can comprise one or more hollow conduits for carrying fluids, hydraulic lines, electrical conductors or communications lines. These tubulars can also be collectively referred to as jumpers.

Each aspect of the invention and the optional additional features and/or method steps associated with it can be used in conjunction with other aspects of the invention where appropriate.

BRIEF DESCRIPTION OF THE DRAWINGS

Embodiments of the invention will now be described with reference to and as shown in the accompanying drawings, in which:—

FIG. 1a is a sectional view of a pod and a side view of a reel with a tubular coiled thereon;

FIG. 1b is a side view of part of the coiled tubular of FIG. 1a inserted within the pod and the reel core removed;

FIG. 2a is a sectional view of the reel of FIG. 1a;

FIG. 2b is a sectional view of an alternative reel of reduced length;

FIG. 2c is a sectional view of an alternative reel of increased diameter;

FIG. 11 is a perspective view of an another alternative deployment unit comprising a reel;

FIG. 12 is a side view of the deployment unit of FIG. 11;

DETAILED DESCRIPTION OF THE INVENTION

Figure 3:
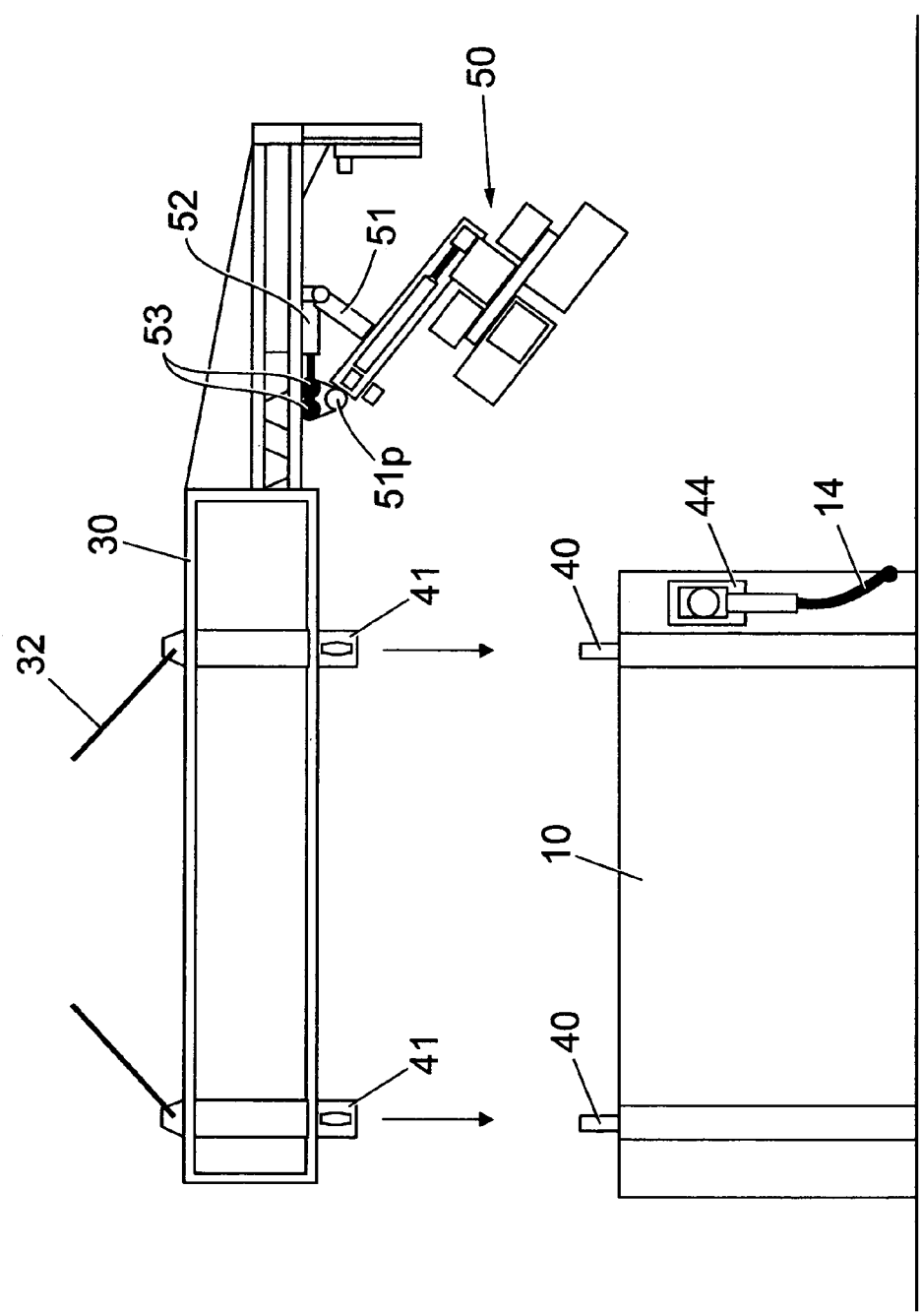
FIG. 3 is a side view of a deployment unit and a pod.

The method described in the following embodiment requires the tubular to be deployed from within a container or pod. Since conventional methods deploy tubular from a reel, a dedicated process of loading a tubular within a pod is shown in FIGS. 1a and 1b. Loading of the tubular within the pod occurs prior to deployment of the tubular along the predetermined path, which according to the first embodiment lies between two subsea installations.

FIG. 1a shows a substantially cylindrical hollow pod 10 having an inner diameter 11 which can accommodate a reel 12. The reel 12 has a core 15 of reduced diameter, an end plate 16 and a detachable end plate 17.

A jumper 14 is coiled around the core 15 of the reel 12 as shown in the cross-sectional view of FIG. 2a. The jumper 14 is installed on the reel 12 following the manufacturing process. According to the first described embodiment, the jumper 14 is installed on the reel with a degree of reverse twist to compensate for the degree of twist experienced by the jumper 14 as it is withdrawn from the reel 12.

In the present embodiments, the jumper 14 is an electric power cable to provide an electrical communication to link the power and control systems between two subsea installations (not shown). Although, in other embodiments, the jumpers 14 can include or consist of electrical cables, communications cables, hydraulic hose, conduits for carrying fluids or any combination of these lines in a bundle.

The length of the jumper 14 is selected according to the distance between the two subsea installations that it is intended to connect. The typical length of the jumper 14 can vary from 20 metres to several kilometres and cross-sections of the lines or bundles making up the jumper can be around 100 mm in diameter. The jumper 14 is fitted with first and second end terminations 54, 44 at each end to couple the ends of the jumper 14 with sockets (not shown) on the two subsea installations.

The outside diameter of the jumper 14 coil when in position on the loading reel 12 should ideally be a sliding fit into the inner diameter 11 of the jumper pod 10. A calculation is required to establish the jumper 14 coil sectional area so that the loading reel 12 can be adjusted to achieve a sliding fit within the pod 10. Thus, depending on the length of the jumper 14 required, the core 15 diameter of the reel 12 may require adjustment as shown in FIG. 2c where a reel 20 is provided having a reduced width and an enlarged diameter. The loading reel can also be adjusted by altering the reel length as shown in FIG. 2b, where a reel 18 is provided with a reduced width enabling a smaller length of jumper 14 to be coiled thereon.

Before the pod 10 is deployed subsea, the reel 12 bearing the coiled jumper 14 is inserted into the pod 10. The jumper 14 is permitted to relax after insertion so that the outer diameter of the coiled jumper 14 increases slightly. The sliding fit and the ability of the material of the jumper 14 to relax and increase the coil diameter slightly following insertion into the pod 10 enables the outer diameter of the jumper 14 to react against the inner diameter 11 of the pod 10. The core 15 of the reel 12 is then removed by detaching the end plate 17, which closes one end of the pod 10 such that the jumper 14 is retained therein, biased against the inner surface of the pod 10 by its own resilience.

The pod 10 is shown in greater detail in FIG. 3 and in this embodiment, it is provided with at least four connectors 40 on an upper surface thereof. The second end termination 44 of the jumper 14 is retained on a side of the pod 10 in a parked position.

A deployment unit 30 is provided in this embodiment with at least four connectors 41 on a lower surface thereof corresponding to the connectors 40 on the pod 10. The deployment unit 30 is positioned above the pod 10 and moved towards the pod 10 as shown by arrows in FIG. 3. The connectors 40, 41 are fastened to secure the deployment unit 30 to the pod 10. An upper surface of the deployment unit 30 is attached to a line 32 enabling the deployment unit 30 to be suspended.

A roller assembly shown generally at 50 is fixed to the deployment unit 30. The position of the roller assembly 50 is movable to selectively run two wheels 53 along tracks (not shown) fixed on the deployment unit 30 by means of an actuating ram 52. A further ram 51 can be actuated to rotate the roller assembly 50 about a pivot point 51p.

Figure 4:
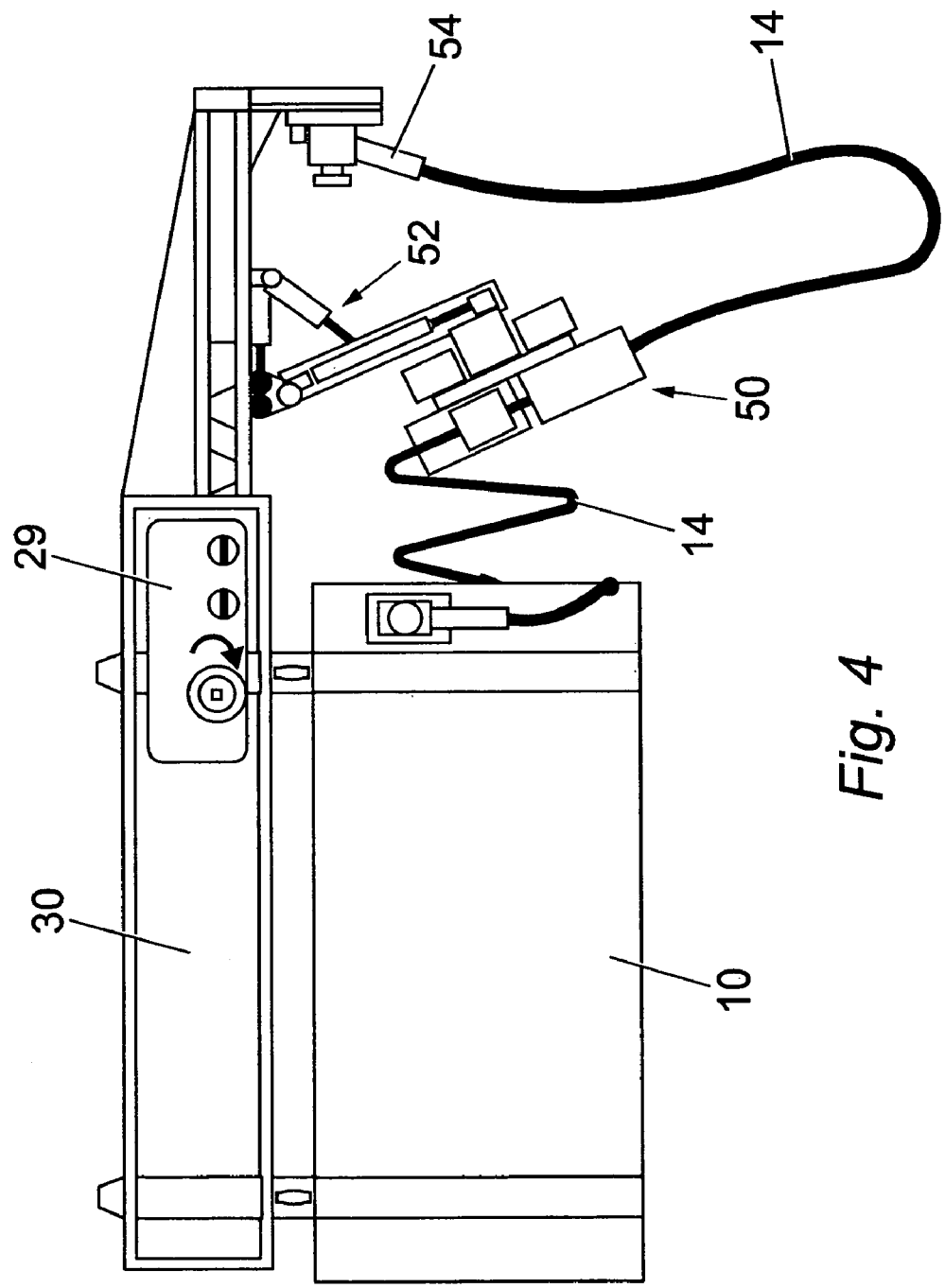
FIG. 4 is a side view of the pod coupled to the deployment unit.

FIG. 4 shows the pod 10 coupled to the deployment unit 30 and a first end termination 54 of the jumper 14 in the form of an end stab plate, attached to the deployment unit 30 in a parked position. The jumper 14 is fed through the roller assembly 50, which is set according to the bend radius of the jumper 14 and the required degree of straightening as discussed with reference to FIG. 6. The deployment unit 30 is provided with a control panel 29 that is operable to control the fine positioning of the deployment unit 30 and modify the bend imposed by the roller assembly on the jumper 14.

Figure 5:
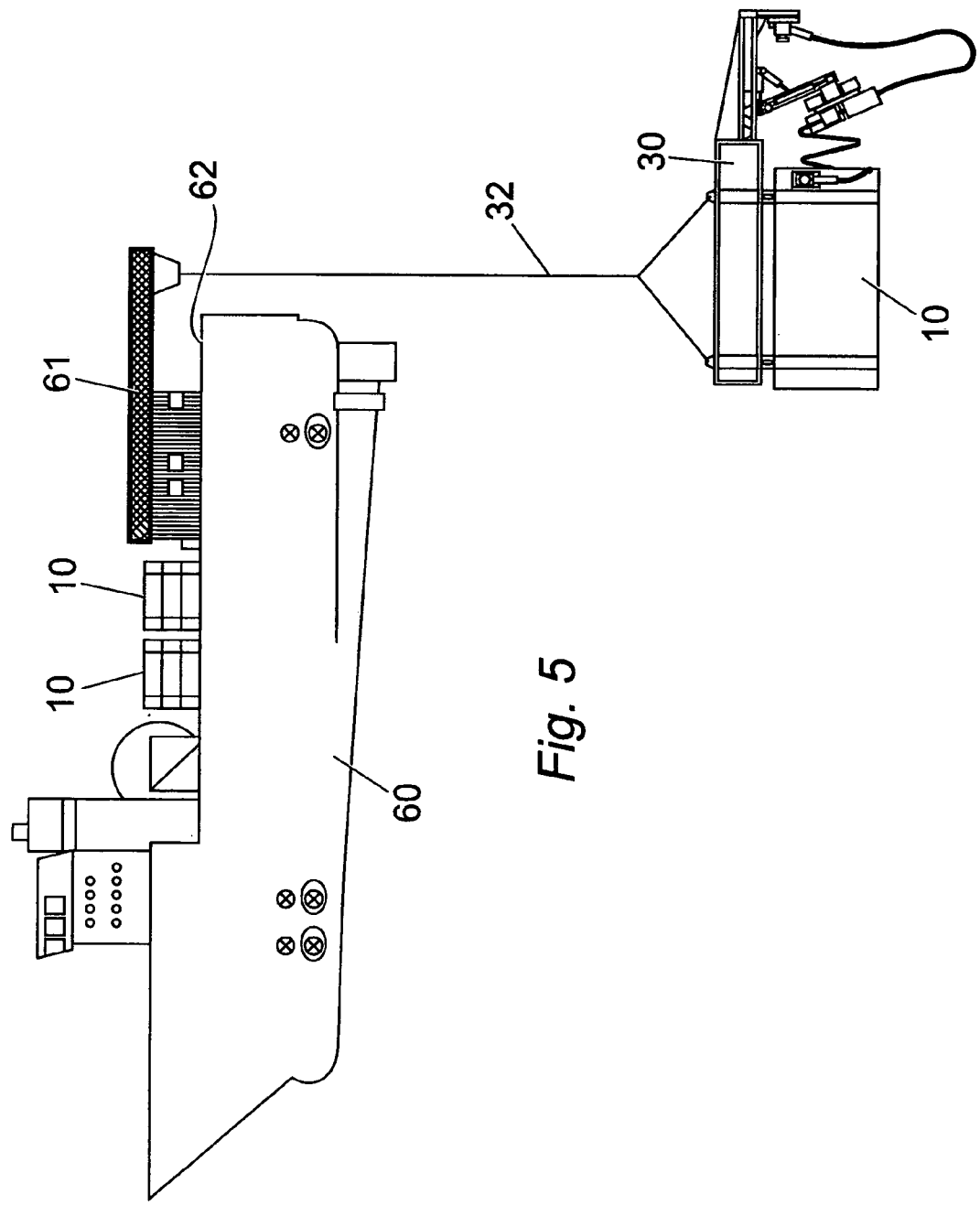
FIG. 5 is a side view of a vessel having the deployment unit and the pod suspended therefrom.

FIG. 5 shows a vessel 60 having a deck 62 with a crane 61 mounted thereon. The crane 61 is shown attached to one end of the line 32, which is also coupled to the deployment unit 30, and pod 10 assembly. Several pods 10 are shown stacked on the deck 62 of the vessel 60.

Figure 6:
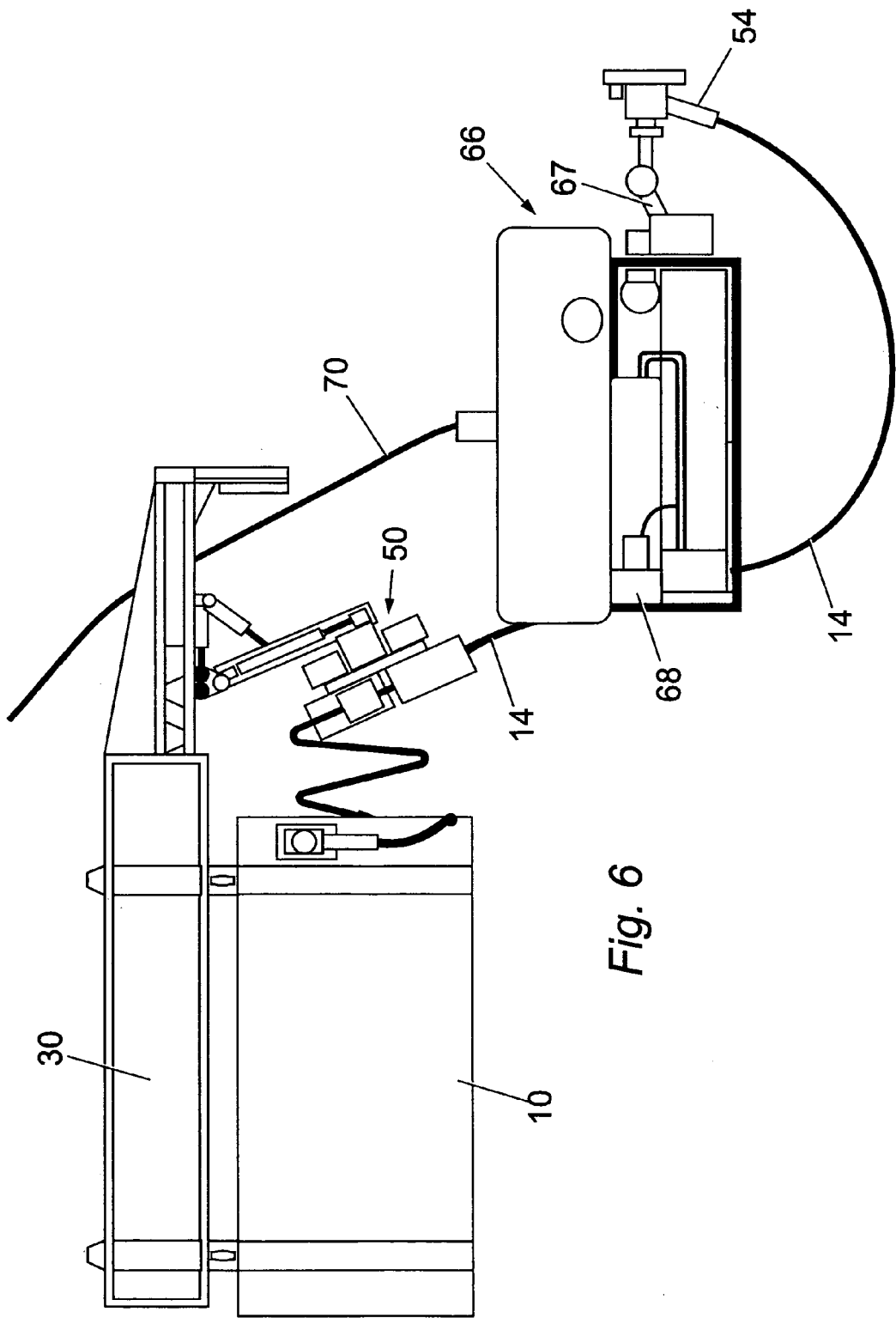
FIG. 6 is a side view of an ROV coupled to a tubular within the pod.

FIG. 6 shows a remotely operated vehicle (ROV) 66. The ROV 66 is an unmanned self-propelled subsea unit equipped with a video camera 68, an arm 67 and other instruments for performing a variety of tasks. The ROV 66 has the capability to withdraw the jumper 14 from the pod 10, control operation of the roller assembly 50 and detach the end terminations 54, 44 from their parked position for attachment to subsea installations. The camera 68 mounted within the ROV 66 provides visual communication with the vessel 60 via a line 70. This allows an ROV pilot on board the vessel 60 to monitor and control the speed and movement of the roller assembly 50 and the ROV 66.

Figure 7:
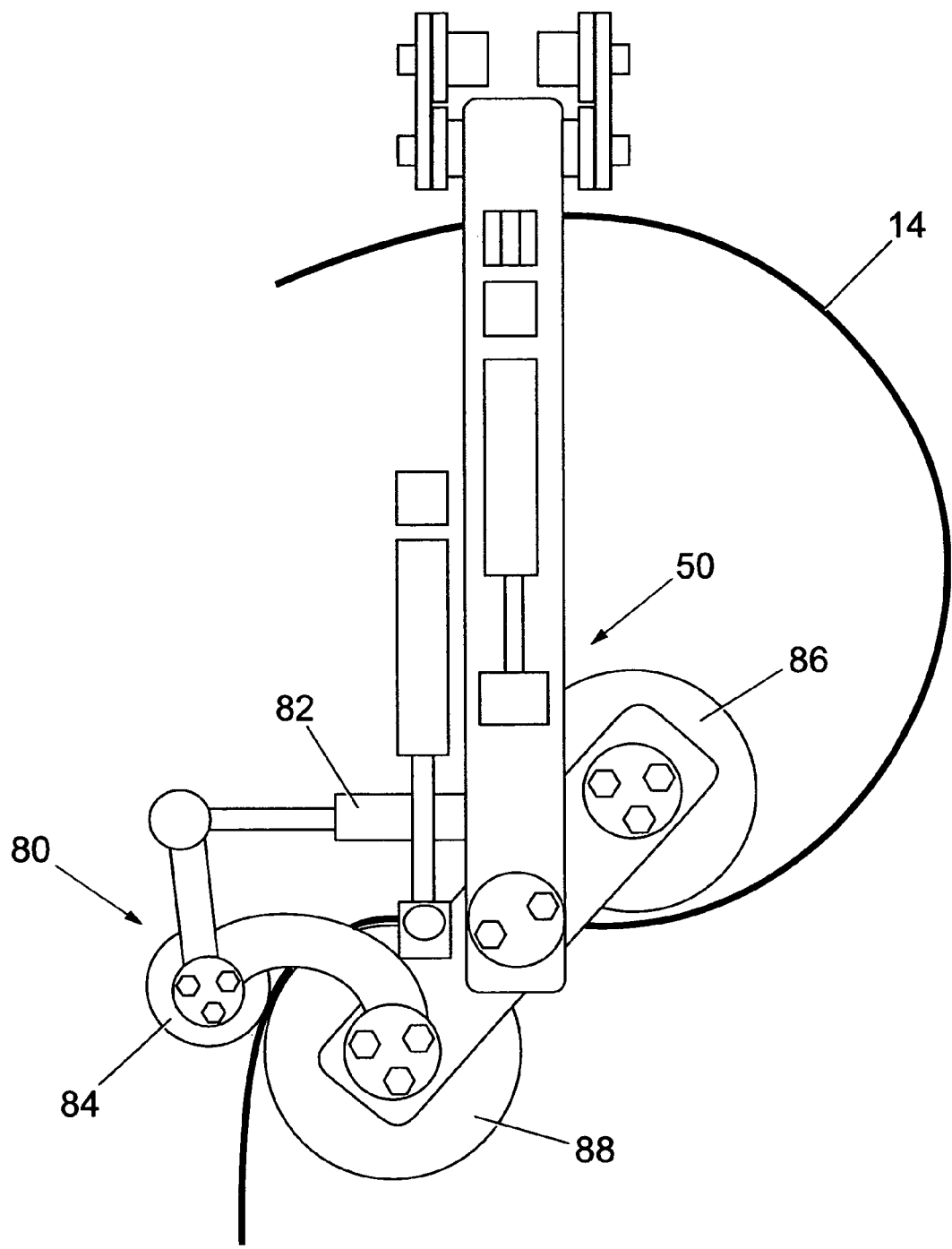
FIG. 7 is a side view of a roller assembly.

The roller assembly 50 is shown in FIG. 7 with a portion of the jumper 14 threaded therethrough. The roller assembly 50 is provided with two rollers of approximately equal diameter; an upper roller 86 and a lower roller 88. The roller assembly 50 is also provided with a roller and ram arrangement shown generally at 80. The roller and ram arrangement 80 includes a hydraulic ram 82 operable to control the spacing between a smaller diameter roller 84 and the lower roller 88. The position of the roller 84 can be located at different points around the circumference of the roller 88 to determine the degree of bend imposed to the jumper 14. This spacing can be initially set at the surface or on board the vessel 60. However, adjustment can also be made by the ROV 66 when the roller assembly 50 is subsea. This is necessary since the pod 10 can contain many coiled layers of the jumper 14 having differing bend radii and therefore requiring different levels of bend to be imposed in order to straighten the jumper 14 prior to deployment.

Before use, the reel 12 is inserted into the pod 10 with a sliding fit in the manner previously described. The jumper 14 is then allowed to relax, which thus enables retention of the jumper 14 within the pod 10 and removal of the reel 12 from the pod 10. The plate 17 is retained at one end of the pod 10 to retain and protect the jumper 14. The end termination 44 is attached in the parking position at the side of the pod 10.

A number of pods 10 are stacked on the deck 62 of the vessel 60 prior to subsea deployment. On board the vessel 60, the crane 61 is coupled to the deployment unit 30 via the line 32. The crane 61 is moved into position over the pod 10 and the deployment unit 30 is lowered so that the connectors 41 on the deployment unit 30 engage with the connectors 40 on the upper surface of the pod 10. The end plate 17 is then removed from the end of the pod 10. The first end termination 54 is moved into its parked position on the deployment unit 30 with a portion of the jumper 14 passing through the roller assembly 50 as shown in FIG. 4. The rams 51, 52 are selectively actuable to move the roller assembly 50 into the required position by pivoting the assembly 50 about the pivot point 51p and along the tracks on the deployment unit 30 using the wheels 53.

The deployment unit 30 and attached pod 10 are then lowered by the crane 61 into the sea through deep water to a distance of approximately 30 metres above the seabed. The vessel 60 should be positioned at, or should move to, the vicinity of the subsea installation to which the first end termination 54 is to be attached. The ROV 66 can make fine adjustments to the positioning of the deployment unit 30 by engaging with the control panel 29 to operate thrusters (not shown) mounted on the ROV 66.

The ROV 66 powers the roller assembly 50 to draw a sufficient length of the jumper 14 out of the pod 10 to allow the ROV 66 to remove the first end termination 54 from the parked position to the point it is to be installed. As shown in FIG. 6, the arm 67 of the ROV 66 latches onto the first end termination 54. While the vessel 60 and the deployment unit 30 remain substantially stationary, the ROV 66 flies the first end termination 54 a short distance towards a socket (not shown) on the subsea installation to which it is to be attached. The ROV 66 engages the first end termination 54 with the socket to connect the jumper 14 to the subsea installation. The ROV 66 returns to the deployment unit 30 where it engages with the deployment unit 30 and provides power to drive/control the roller assembly 50.

The vessel 60 coupled to the deployment unit 30 then moves along, or close to, a pre-determined path to thereby move the deployment unit 30 along the path so that the roller assembly 50 can simultaneously deploy the jumper 14 in the required location.

The jumper 14 is removed from the open end of the pod 10 through the action of the roller assembly 50 and the ROV 66. The pod 10 is moved along the same or a similar axis as the axis of coil of the jumper 14 while the rollers 86, 88, 84 grip the jumper 14 being deployed. This method of jumper 14 deployment enables the jumper 14 to be removed from the pod 10 in a controlled manner. The jumper 14 freely moves when pulled axially out of the pod 10. However, when the pulling force reduces as a result of demand for the jumper 14 being fulfilled, the jumper 14 recoils and returns to a secure state within the pod 10, biased against the inner surface of the pod 10. Thus, pulling the jumper 14 out of the pod 10 is the only method of removal from the pod 10. Vibration, angle of the pod 10 or inclination of the deployment unit 30 does not have any significant effect on the jumper 14 removal from the pod 10. The act of pulling the jumper 14 axially results in a small reduction in bend radius of the jumper 14 allowing the portion of jumper 14 with a smaller bend radius to separate from the inner surface of the pod 10 and to move freely inside the pod 10. Since the minor reduction in bend radius and increase of winding pitch angle is within the elastic limit of the material from which the jumper 14 is constructed, removal of the pulling force causes the jumper 14 to recoil and return to the original bend radius imposed when the jumper 14 is installed in the pod 10 thereby biasing it once more towards the inner surface of the pod 10, or against the radially innermost layer of coiled jumper 14, thereby locking it into its original position.

Throughout deployment, the roller assembly 50, powered by the ROV 66, draws the jumper 14 from the pod 10 and straightens the jumper 14 so that the required profile of jumper 14 is maintained during deployment. The ROV 66 also controls the speed at which the jumper 14 is deployed through the roller assembly 50. If the rollers 86, 88, 84 are rotated too quickly, excess jumper will be deployed on the seabed, where it will coil and be prone to damage and entanglement. However, if the rollers 86, 88, 84 are rotated too slowly, an excess strain is imposed on the jumper 14 with the potential to cause damage to the jumper 14 or the terminals to which it is connected. The camera 68 mounted on the ROV 66 provides visual communication between the vessel 60 and the ROV 66 enabling the ROV pilot on board the vessel to monitor and control the speed at which the rollers 86, 88, 84 are rotating. If required, the roller and ram arrangement 80 can be modified to vary the spacing between the rollers 84, 88 and thus modify the bend imposed on the jumper 14 as it is drawn between the rollers 84, 88. This is sometimes necessary to straighten the jumper 14 from the pod 10 to ensure each coil having different bend radii will be straightened to the required degree:

The ROV 66 can conduct a survey using the camera 68 and communicate back to the vessel 60 via the line 70 to ensure that the jumper 14 is correctly deployed.

When the majority of the jumper 14 has been deployed and the vessel 60 is in the vicinity of the second subsea installation the second end termination 44 is detached from the pod 10 and flown by the ROV 66 for attachment to a socket of the second subsea installation. When the deployment unit 30 is in a position close to where the second end termination 44 is to be deployed, the ROV 66 causes the roller assembly 50 to drive the remaining jumper 14 out from the pod 10. The rollers 84, 86, 88 are then opened to release the jumper 14. The second end termination 44 is moved from its parked position on the side of the pod 10 and flown into position by the ROV 66 to engage with the socket of the second subsea installation.

The required length of the jumper 14 is selected according to the specific application for which it is to be used. Longer lengths of jumper can be achieved by connecting one or more shorter lengths of the jumper 14 using connectors and adaptors at the ends thereof.

As an alternative to the embodiment described above, the second end termination 44 can be provided with a stand (not shown). This is useful where one or more lengths of the jumper 14 are required to be coupled to one another. In this case, the second end termination 44 is detached from the pod 10 by the ROV 66 and taken to the seabed. The stand is positioned such that the second end termination 44 is maintained approximately 2 metres above the seabed. This is advantageous since use and movement of the ROV 66 close to the seabed will cause mud and subsea debris to be stirred resulting in bad or reduced visibility for the ROV pilot operating the ROV 66 remotely from the vessel 60.

Once the second end termination 44 has been deployed in the required position the deployment unit 30 and coupled empty pod 10 are lifted to the surface of the sea and returned to the deck 62 of the vessel 60 by the crane 61. The empty pod 10 can then be detached from the line 32 on the deck 62 of the vessel 60 and a loaded pod 10 can be coupled to the line 32 allowing the next length of jumper 14 to be deployed in the same manner as described above. In order to save time, two deployment units 30 can be used simultaneously to increase the speed of the jumper 14 deployment operation.

In the event of bad weather giving rise to dangerous operating conditions, the deployment operation can be halted when the jumper 14 is partially installed. The ROV 66 decouples the pod 10 from the deployment unit 30. The deployment unit 30 and the ROV 66 can then be retrieved onto the vessel 60 until conditions improve and the deployment can continue. At that point, the deployment unit 30 will be lowered into position and the ROV 66 can provide minor adjustments to align the deployment unit 30 with the pod 10 at the seabed as well as latching the pod 10 to the deployment unit 30.

Since the vessel 60 is used to move the deployment unit 30 in the region of the subsea installations, it is important to ensure that the relative positioning of the deployment unit 30 and the vessel 60 is predictable so that the deployment unit 30 can be accurately positioned in the region of the subsea installations. As the deployment unit 30 is towed by the vessel 60, the effective drag of the sea water on the deployment unit and the line 32 can cause the deployment unit 30 to lift. In addition, as the vessel alters course, the deployment unit may become misaligned with the direction of travel. Accordingly, a deployment unit 130 is shown in FIGS. 8a and 8b with attached stabilisers to account for misalignments caused by movement of the deployment unit 30 through the sea water and the change of course of the vessel 60.

Figure 8A:
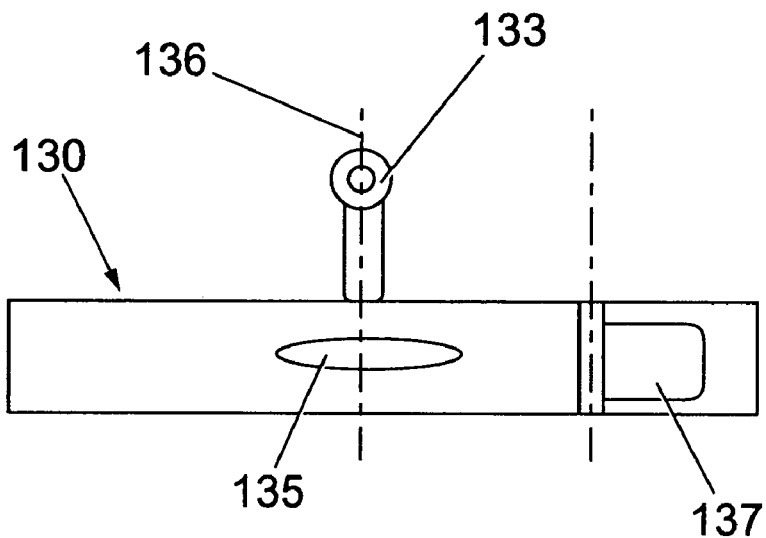
FIG. 8a is a side view of an alternative deployment unit fitted with stabilisers.

FIG. 8a shows the deployment unit 130 fitted with a lift line link 133 coupled to a stabiliser 135. The stabiliser 135 acts to maintain the lift line link 133 co-axial with a vertical axis 136. Several lift line links 133 with accompanying stabilisers 135 may be provided at each point of attachment of the line 32. The deployment unit 130 is also provided with a directional stabiliser in the form of a rudder 137. The rudder 137 acts to ensure that a longitudinal axis 138 of the deployment unit 130 is substantially aligned with the direction of travel.

FIG. 8a shows the lift line link 133 in alignment with the vertical axis 136 and the longitudinal axis 138 of the deployment unit 130 aligned in the direction of travel.

Figure 8B:
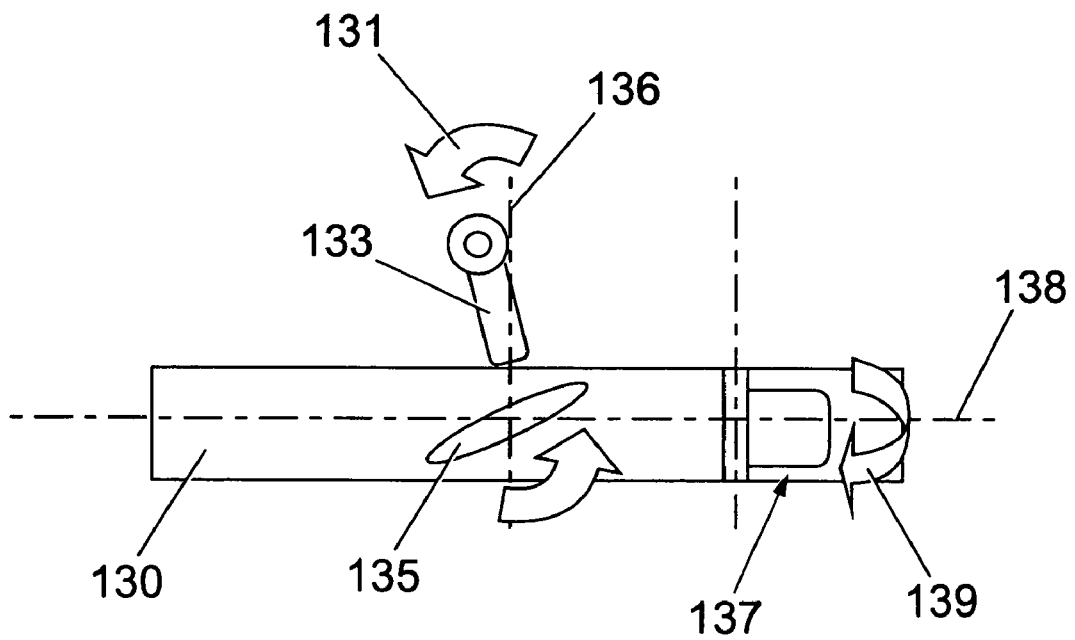
FIG. 8b is a side view of the deployment unit of FIG. 8a misaligned vertically and in the direction of travel of the unit.

FIG. 8b is provided with an arrow 131 showing the degree of vertical misalignment between the axis 136 and the lift line link 133. Similarly, an arrow 139 shows the directional misalignment of the longitudinal axis 138 of the deployment unit 130 relative to the direction of travel of the deployment unit 130. A mechanism of pivots and levers attached to the lift line link 133 and the rudder 138 cause the deployment unit 130 to revert to the level position shown in FIG. 8a.

An alternative method of deploying and simultaneously straightening a jumper 14 along a predetermined path is described with reference to FIG. 9. According to this embodiment of the invention, an oscillating twist is applied to the jumper 14 during loading onto the reel 12. The oscillating twist is applied by twisting a given length of jumper 14 by a predetermined amount in one direction (e.g. clockwise) and twisting a corresponding subsequent length of jumper 14 by the same amount in an opposite direction (e.g. anticlockwise). Without an oscillating twist, any particular cable within the jumper 14 consistently positioned towards an outer diameter would need to be longer than a cable consistently positioned towards an inner diameter of the jumper 14. Therefore, an oscillating twist effectively eliminates the need to incorporate different lengths of cables within the jumper 14 depending on their proximity to the outer or inner diameter. In addition to the oscillating twists, one reverse twist is applied to the jumper 14 on each occasion that the jumper 14 is fully wound around the reel 12 in a direction opposing (and to compensate for) the slight displacement and twist imposed by each turn of the coil. The latter reverse twist is preferred but not essential when used in conjunction with a rotatable pod as described hereinbelow.

Figure 9:
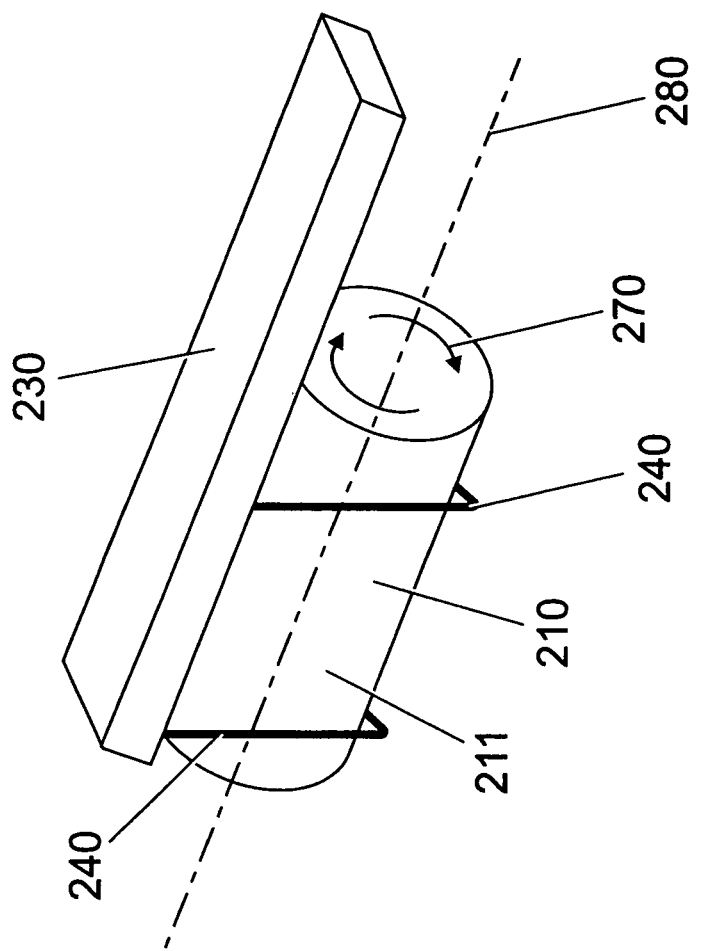
FIG. 9 is a perspective view of an alternative deployment unit according to another aspect of the invention.

FIG. 9 shows an alternative pod 210 coupled to a deployment unit 230 by means of two connectors 240. The pod 210 comprises an inner cylinder (not shown) into which the jumper 14 is loaded and an outer cylinder 211 sharing an axis 280 with the inner cylinder. The outer cylinder 211 of the pod 210 is fixed to the connectors 240 and the inner cylinder is rotatably mounted within the outer cylinder 211 by means of at least two axially spaced low friction couplings (not shown) such as roller-bearings. Although not shown in FIG. 9, the deployment unit 230 is also provided with the control panel 19 and has the roller assembly 50 attached thereto for engaging with, pulling and straightening the jumper 14.

The jumper 14 is loaded into the inner cylinder of the pod 210 via the sliding reel 12 in a manner similar to that described with reference to FIGS. 1a-2c. Prior to deployment of the jumper 14 a mud mat (not shown) is deployed on the seabed. The mud mat is a temporary metal foundation covering a large area that allows equipment to be stored on the sea bed without the risk of the equipment sinking beneath the mud. A number of pods 210 loaded with jumpers 14 are placed onto the mud mat in preparation for the deployment operation.

The deployment unit 230 is manoeuvred into position proximate the stacked pods 210 on the mud mat. The wheels 53 of the roller assembly 50 are moved along the tracks by the actuating ram 52. The actuating ram 51 rotates the roller assembly 50 about the pivot point 51p to back off and facilitate loading of the pod 210 onto the deployment unit 230. The jumper 14 within the pod 210 has one free end carrying the first end termination 54 of the jumper 14 arranged in an S-bend configuration. The ROV 66 feeds the first end with the end termination 54 between the upper and lower rollers 86, 88 of the backed off roller assembly 50. The ROV 66 can then secure the pod 210 to the deployment unit 230 by means of the connectors 240. The deployment unit 230 and the attached pod 210 is then transported to the deployment location by the vessel 60 for attachment of the first end termination 54 to a first subsea installation in a similar manner as described with reference to the first embodiment.

The roller assembly 50 on the deployment unit 230 deploys the jumper 14 at the required rate. As the jumper 14 is uncoiled, any twists therein have a significant amount of stored energy that must be dissipated in order to avoid damage to and deformation of the jumper 14. The torque from the jumper 14 as it is uncoiled acts between the first roller 86 and the inner cylinder of the pod 210. Since the roller assembly 50 is fixed, the torque applied by the jumper 14 acting to oppose and resolve twists therein acts on the inner cylinder of the pod 210 and allows the inner cylinder to rotate, enabled by the roller bearings to avoid deforming the jumper 14. Thus, the inner cylinder can passively rotate in response to torque applied by the jumper 14 on the inner surface of the inner cylinder.

If required, a driver (not shown) can power assist rotation of the inner cylinder in the event that the torque applied by the jumper 14 is not sufficient to initiate rotation of the pod 210. The driver can comprise a hydraulic or electric motor operable from the control panel 29 on the deployment unit 230. When the torque on the roller assembly 50 exceeds a certain predetermined value, the driver can be actuated and the motor initiates rotation of the inner cylinder to alleviate excess strain by releasing the stored energy of the uncoiling jumper 14 and until the torque is reduced to an acceptable level.

Once the jumper 14 has been deployed by the roller assembly 50 and the second end termination 44 is attached to a subsea installation in the same manner as described for the previous embodiment, the vessel can manoeuvre the deployment unit 230 above the mud mat to release the empty pod 210 and then attach to another pod 210 containing a jumper 14. The pods 210 can be dropped off and engaged by deployment units 230 subsea thereby avoiding the constant need for retrieving and despatching pods to and from the surface. It should be understood that the method of deploying the mud mat and depositing and retrieving pods subsea can also be used in conjunction with the other embodiments of the invention, rather than storing and collecting pods 10 on the deck 62 of the vessel 60.

The method of the invention saves vessel time by making it possible for the vessel 60 to deploy a single jumper 14 over a greater length than conventional methods. The ROV 66 simultaneously guides and controls the operation in addition to installing the end terminations 44, 54 in the required position.

Coiling a jumper 14 on a reel or within the pod 10 can cause permanent deformation of the jumper 14 beyond its elastic limit. Accordingly, uncoiling the jumper without straightening it results in a haphazard deployment on the seabed, which has the potential to cause damage to the cables and lines making up the jumper 14. The roller assembly 50 enables the coiled jumper 14 to be straightened and furthermore, permits the degree of reverse bend imposed on the jumper 14 to be modified throughout the deployment, taking into account the different bend radii from the innermost to the outermost winding.

The axial alignment of the pod 10 and the jumper 14 winding in the direction in which the jumper is being laid accommodates a level of error in straightening of the jumper. This is preferable to a reel arrangement, since any error in straightening jumper deployed from a reel is likely to result in a random arrangement and misalignment of the jumper 14 as it is laid on the seabed. Thus, with the latter method a greater length of jumper may be required to cover a given distance and may result in damage to the jumper where localised twisting or bending occurs.

Figure 13:
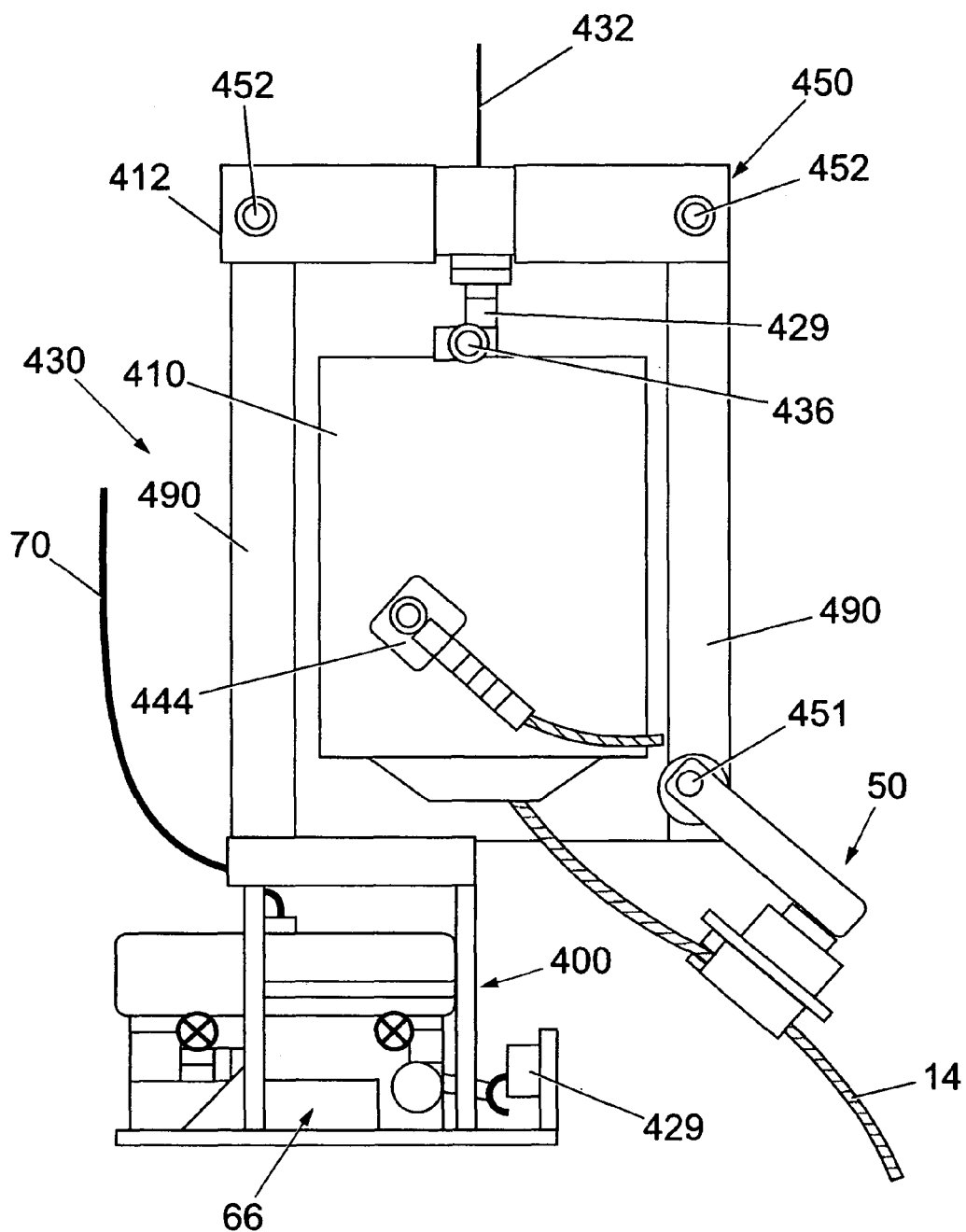
FIG. 13 is a side view of another alternative deployment unit and a vertically disposed pod.

An alternative deployment unit 430 shown in FIG. 13 includes a frame 412 having a pod 410 rotatably mounted thereto. This arrangement differs from the embodiments shown in FIGS. 3 to 6 and FIG. 9, in that the pod 410 is mounted substantially perpendicular to the seabed.

The frame 412 of the deployment unit has supports 490 and a lifting beam 450 to which the pod 410 is rotatably coupled at a centrally disposed location. The lifting beam 450 is attached to a lift line 432. Another end of the lift line 432 is attached to the vessel 60, enabling movement of the deployment unit 430 to be controlled by operators on the vessel 60.

The rotatable coupling of the pod 410 to the deployment unit 430 is achieved by means of a swivel bearing 429 that allows 360° movement of the pod 410 about a cylinder axis of the pod 410. The pod 410 is detachably connected to the swivel bearing 410 using an ROV operated latch 436.

The supports 490 are detachably connected to the lifting beam 450 by ROV operable latches 452. The base of one support carries an ROV cradle 400 having a control panel 427. The ROV cradle 400 accommodates the ROV 66 that can control deployment using the control panel 429. Power can be supplied to the deployment unit 430 using a power line 70 provided to supply the ROV 66. Towards the base of another support 490, the roller assembly 50 is attached about a pivot point 451. The jumper 14 contained within the pod 410 can be fed through the roller assembly 50 to straighten the jumper and aid deployment, as described with reference to FIG. 7.

Figure 14:
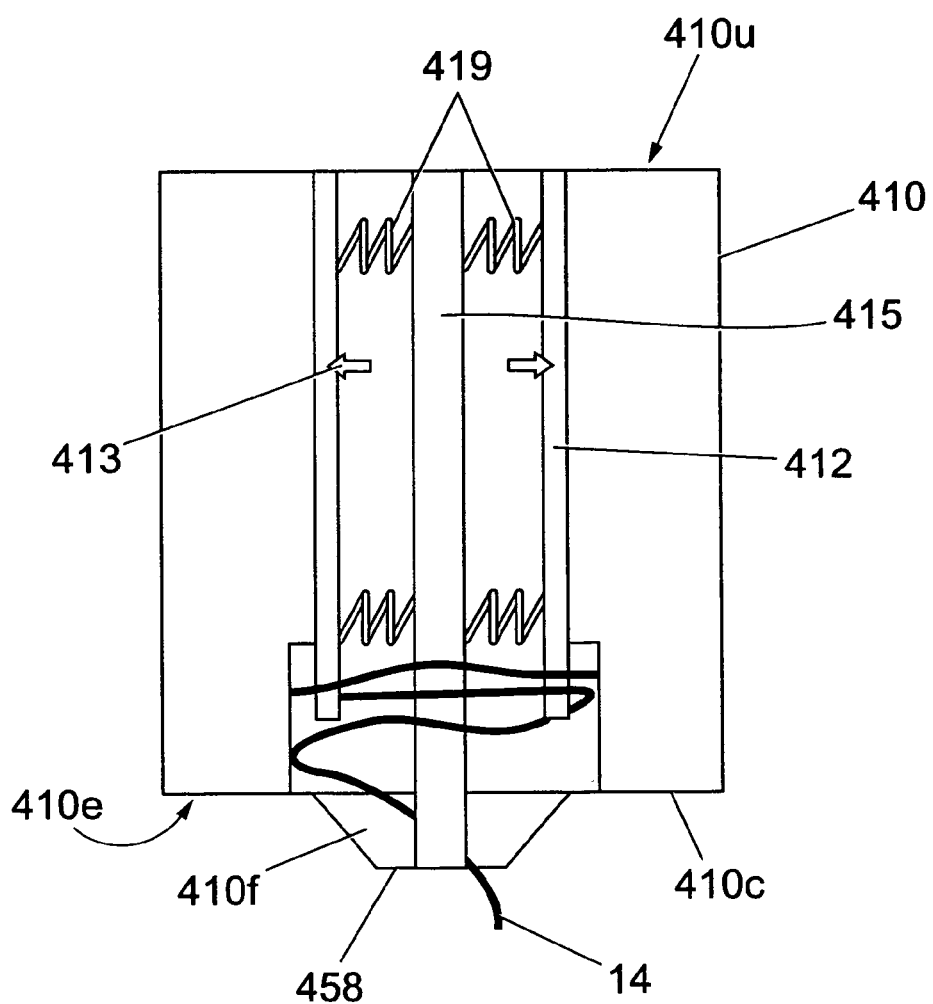
FIG. 14 is a sectional view of the contents of the pod of FIG. 13.

FIG. 14 shows the arrangement of the coiled jumper within the pod 410. The pod 410 is substantially cylindrical in shape and has a closed upper end 410u that is attached to the swivel bearing 429 in use and a lower partially closed end 410e. The partially closed end 410e has an outer retaining portion 410c that extends radially inwardly from the outer diameter of the pod 410 and joins a frustoconical portion 410f extending downwardly and having a diameter that narrows towards a circular opening 458. The interior of the pod 410 contains an expandable core that has a centrally disposed inner core 415 fixed to the closed upper end 410*u* of the pod 410. The inner core 415 is attached to an outer core 412 comprising radially moveable parts that are biased outwardly by resilient members 419 such as springs. Thus, the outer core 412 is biased radially outwardly in the direction of arrows 413 to prevent the inner windings dropping or collapsing as lengths of jumper 14 are pulled off the coil. However, provision of the expandable core is optional, since the stored energy within the coiled jumper 14 applies a radial force that biases the jumper 14 against the inner diameter of the pod 410 and this can be sufficient to maintain the jumper 14 within the pod 410.

Prior to deployment, the deployment unit 430 is suspended from the vessel 60 using the lift line 432. The vessel 60 is the manoeuvred in the region of the predetermined path. The deployment operation is controlled by the ROV 66 that feeds the jumper 14 through the roller assembly 50. The ROV 66 can also monitor the torque applied by the jumper 14 on the roller assembly 50 as it is deployed. Free rotation of the pod 410 during deployment is enabled by the swivel bearing 429 to compensate for any twists in the jumper 14. However, should the torque applied by the jumper 14 on the roller assembly 50 exceed a predetermined maximum level, rotation of the pod 410 can be powered by the ROV 66.

Mounting the pod 410 so that the pod axis 410 is aligned in the direction in which gravity is acting (typically vertically with respect to the seabed) has advantages over the embodiment where the pod 210 is mounted perpendicular to this direction (typically horizontal with respect to the seabed). Vertical orientation of the pod 410 with respect to the seabed provides a more direct load path rather than the deployment unit 230 itself having to act as a lifting beam. This can significantly reduce the weight of the deployment unit 430 that is carrying a given length of jumper 14.

As a result of the vertical orientation of the pod 410 suspended by the swivel bearing 429 from a single point, free rotation of the pod 410 is more easily achieved than a horizontal pod 210 mounted on bearings that may have a greater tendency to jam when the pod 210 is carrying a 20 Ton jumper 14.

During deployment of the jumper 14 that is vertically mounted, less power may be required to drive the roller assembly 50, since gravity will aid the deployment process of the jumper 14 from a vertically oriented pod 410.

Preferably, each deployment unit 30, 430 is equipped with several sets of rollers to enable different rollers to be selected for use with different types of jumper. It is also preferable if a groove (not shown) is provided in the circumference of each roller to enable the rollers to fit the particular jumper. The rollers should be selected to fit the particular jumper to be deployed, enabling the jumper to be gripped tightly to provide traction, but without causing any damage by crushing the jumper.

One advantage of the embodiment of the present invention where installation of the jumper 14 is achieved from within the pod 10 is that the apparatus containing the jumper 14 is more robust. The pod 10 protects the jumper 14 during storage, transportation and manipulation of the pod 10 throughout offshore operations.

Figure 10:
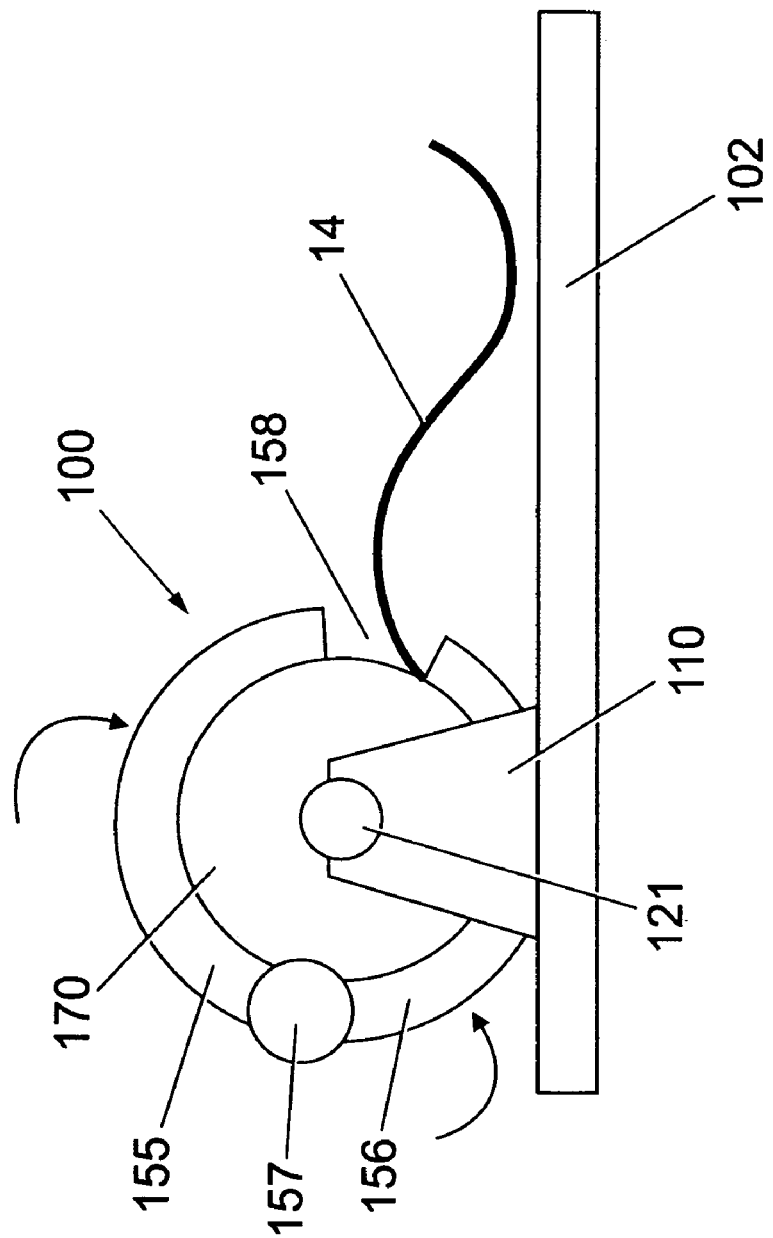
FIG. 10 is a side view of an alternative deployment unit comprising a reel.

FIG. 10 shows an alternative deployment unit indicated generally at 100. The deployment unit 100 has a base plate 102 to which two upstanding flanges 101 are attached.

Following manufacture, the jumper 14 is wound onto a reel (not shown) having two end plates 170. During winding onto the reel, oscillating twists and optionally reverse twists can be applied to the jumper 14 in the manner previously described. The reel is then rotatably coupled relative to the end plates 170 and the flanges 101 about an axis 121. Two substantially semi-cylindrical half shells 155, 156 pivotable about a hinge 157 are clamped around the reel and the coiled jumper 14 leaving a longitudinal opening 158 through which the jumper 14 can be deployed. The jumper 14 is permitted to relax and is thus biased outwardly against the shells 155, 156. Accordingly, the shells 155, 156 prevent a further relaxation of the jumper 14 and further expansion of the coil diameter.

Deployment of the jumper 14 from the deployment unit 100 can be achieved using the vessel 60 and can be assisted using the roller assembly 50, the ROV 66 and the stabilisers as described with reference to the previous embodiments.

Optionally the hinge 157 can be fixed to the end plates 170 and the shells 155, 156 can be pivotable about the hinge 157 and biased inwardly. Therefore the shells 155, 156 can be movable relative to the coiled jumper 14. The width of the opening 158 can thus be varied depending on the amount of jumper 14 remaining on the reel. As a result, a substantially constant force can be applied to the outer windings of the jumper 14 on the reel. This arrangement enables the jumper 14 to be retained as a coil without imposing a tension to the jumper 14 itself.

An alternative deployment unit 110 arrangement is shown in FIGS. 11 and 12. The unit 110 is mounted on a base plate 102 and includes a reel with end plates 160 having a coil axis 120 about which the jumper 14 is wound. The reel is rotatably mounted to an upstanding flange 101 attached to the base plate 102, as described in connection with the previous embodiment. A plurality of rotatable cylinders 150 are attached to the end plates 160 circumferentially spaced around the coiled jumper 14. The presence of the rotatable cylinders 150 reduces the friction experienced by the jumper 14 as it is withdrawn tangentially from the coil.

The deployment of the jumper 14 can be achieved as described with reference to FIG. 5 by suspending the reel from the vessel 60. The ROV 66, the roller assembly 50 and the stabilisers can also be used in conjunction with the deployment unit 110.

The rotatable cylinders 150 can be mounted on the end plates 160, such that they are capable of radial movement. The rotatable cylinders 150 can be biased radially inwardly in the direction of arrows 151 to act on the core of the reel. This aids the winding of the jumper 14 onto the reel, for example, prior to deployment or during a retrieval operation to collect the jumper 14 from the seabed. Initially the cylinders 150 act on the core of the reel and as the jumper 14 is wound through two adjacent cylinders 150 onto the reel, the radial force continues to be applied to the coiled jumper 14. As the diameter of the coil increases, the cylinders 150 can move radially to accommodate the additional windings. Furthermore, the rotation of the cylinders 150 reduces the friction experienced by the jumper 14. In this manner, the coil remains captive both during deployment and during loading of the reel without the need to apply a tension to the jumper 14 itself. Optionally, the rotatable cylinders 150 can be powered to drive the jumper 14 from the reel for deployment. The distance between the centre of the reel and the rollers can thus be optionally controlled depending on the required degree of relaxation of the coil.

According to another embodiment of the invention, the jumper can be used to connect an installation on the surface of the sea (hereinafter "topside") to another topside installation or onshore. For example, at least one of the topside installations can be terminals of an offshore wind farm and the jumper 14 can comprise electrical distribution cables. In the case where the jumper 14 is intended to connect two separate topside installations, first and second reinforced end portions of the jumper (not shown) are manufactured with armoured load-bearing external layers. A deployment unit having a pod that optionally has a rotatably coupled inner cylinder is provided with a detachable basket (not shown) coupled therebeneath and the second reinforced end portion of the jumper is accommodated therein.

Prior to deployment, the first reinforced end portion has its end termination attached to a topside termination. The first reinforced end portion is then deployed from the surface and the deployment unit with the pod (as previously described) and attached basket is lowered to the seabed. The first reinforced end portion of the jumper preferably forms an S-profile extending between the seabed and the topside termination. The jumper accommodated within the pod can then be deployed along the seabed using a deployment facilitator such as the roller assembly 50 in a similar manner to the previous embodiments. At the required termination location for the second end of the jumper, the basket can be detached from the deployment unit and the ROV 66 can attach a lift line from the surface vessel 60 to lift the second end portion to the surface for termination at a second topside installation.

The jumper described above is provided with integral reinforced end portions. In another embodiment, a separate reinforced umbilical (not shown) can be provided with a subsea termination. The reinforced umbilical is then lowered from the surface and the jumper 14 can be attached to the subsea termination of the umbilical on the seabed. The former method has the advantage that it avoids the need for subsea connections.

A further advantage of the above mentioned embodiment for connecting the jumper to topside terminations is the cost saving, since only two ends of the jumper are required to be reinforced, or reinforced umbilicals can be attached to the or each end of the jumper rather than fortifying the entire length of the jumper. Thus, the method according to the invention is intended to include a complete jumper distribution system for connecting subsea terminations as well as topside and onshore terminals using reinforced portions of jumper or umbilical connections where necessary.

Modifications and improvements can be made without departing from the scope of the invention.

The invention claimed is:

1. A method of deploying a tubular along a predetermined path, the method including the steps of:
    coiling a tubular and accommodating the tubular in a container such that at least a portion of the coiled tubular is biased radially outwardly against the container;
    rotatably coupling the container to a frame, the coupling permitting the frame and the container to be deployed together;
    deploying the tubular from the container along the predetermined path and allowing the container to rotate during deployment.

2. A method according to claim 1, including moving the container adjacent the predetermined path and simultaneously deploying the tubular along the predetermined path.

3. A method according to claim 1, including coupling the container to a deployment unit, suspending the deployment unit from a vessel; moving the vessel to thereby move the deployment unit adjacent the predetermined path; and stabilising the deployment unit such that moving the vessel causes corresponding movement of the deployment unit.

4. A method according to claim 1, including substantially aligning the coil axis of the coiled tubular with the direction in which gravity acts during at least part of the deployment.

5. A method according to claim 1, including uncoiling and substantially straightening the tubular prior to deployment along the predetermined path.

6. A method according to claim 3, including attaching a deployment facilitator to the deployment unit for facilitating deployment of the tubular.

7. A method according to claim 1, including feeding the tubular between two or more rollers and thereby substantially straightening the tubular prior to deploying the tubular along the predetermined path.

8. A method according to claim 1, including deploying at least a portion of the tubular from the coil by applying a pulling force to at least a portion of the tubular in a direction substantially parallel to the coil axis.

9. A method according to claim 1, including measuring the torque imposed by the tubular on the container during deployment and independently powering rotation of the container when the torque exceeds a predetermined maximum value.

10. A method according to claim 1, the method including the step of: pulling the tubular tangentially from the reel to thereby deploy the tubular.

11. A method according to claim 10, including twisting the tubular during coiling of the tubular.

12. Apparatus for use in the deployment of a tubular, the apparatus comprising a container having a coiled tubular at least partially accommodated therein, wherein at least part of the coiled tubular is biased radially outwardly against the container; the apparatus further comprising a frame, wherein the coiled tubular is retained at least partially within a bore of the container and the container is rotatably mounted on the frame such that the container is rotatable about the coil axis, the coupling permitting the frame and the container to be deployed together.

13. Apparatus according to claim 12, wherein the frame is coupled to a power supply for independently powering rotation of the container.

14. Apparatus according to claim 13, wherein the container has a partially enclosed end that at least partially retains the coiled tubular within the container.

15. Apparatus according to claim 13, wherein the container comprises a centrally disposed expandable core.

16. Apparatus according to claim 12, wherein the tubular is provided with at least one reinforced end portion.

17. Apparatus according to claim 12, wherein each end of the tubular is provided with an end connector and at least one of the end connectors has an associated stand for supporting the end connectors at a predetermined distance above the seabed.

18. Apparatus for use in the deployment of a tubular, the apparatus comprising a deployment unit having a coiled tubular at least partially accommodated therein, wherein the deployment unit comprises a reel around which the tubular is coiled, wherein the reel is arranged to rotate about the coil axis, and wherein the reel has a retainer arranged such that at least a portion of the coiled tubular is biased radially outwardly against the retainer.

19. A method of deploying a tubular in a fluid along a predetermined path, the method including the steps of:
    coupling the tubular to a container, the container being rotatably coupled to a frame;
    suspending the container in the fluid; and
    moving the container and frame adjacent the predetermined path and simultaneously deploying the tubular along the predetermined path.

20. A method according to claim 19, including coupling the container to a deployment unit, suspending the deployment unit from a vessel; moving the vessel and thereby moving the deployment unit adjacent the predetermined path; and stabilising the deployment unit such that moving the vessel causes corresponding movement of the deployment unit.

21. A method according to claim 19, including providing a deployment facilitator adapted to transfer at least part of the tubular from a first storage configuration to a second deployed configuration.

22. Apparatus for facilitating deployment of a tubular, the apparatus comprising a coiled tubular and a deployment facilitator, the coiled tubular being located with a container that is rotatably mounted to a frame, the coupling permitting the frame and the container to be deployed together, wherein the tubular is arranged to feed into the deployment facilitator in use, and wherein the deployment facilitator is adapted to substantially reverse the coil bend of the tubular.

23. Apparatus according to claim 22, wherein the deployment facilitator is adjustable to vary the degree of reverse bend imposed on the tubular.

24. Apparatus according to claim 22, wherein the deployment facilitator comprises a roller assembly having at least two counter-rotatable rollers for accommodating the tubular between the two rollers.

25. Apparatus according to claim 24, wherein the roller assembly comprises a further roller rotatably mounted separate from the counter-rotatable rollers to feed the tubular through the counter rotatable rollers at a predetermined angle.

\* \* \* \* \*